July 26, 1932.  R. R. OSBORN  1,869,211
AEROFOIL OPERATING MECHANISM
Filed March 19, 1930   2 Sheets-Sheet 1
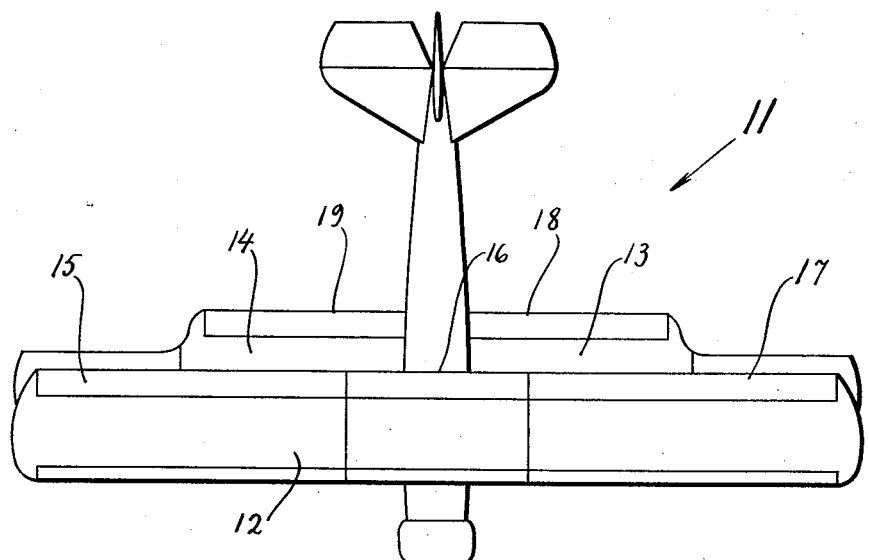
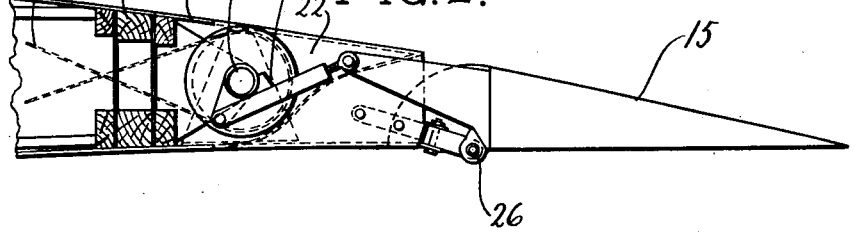
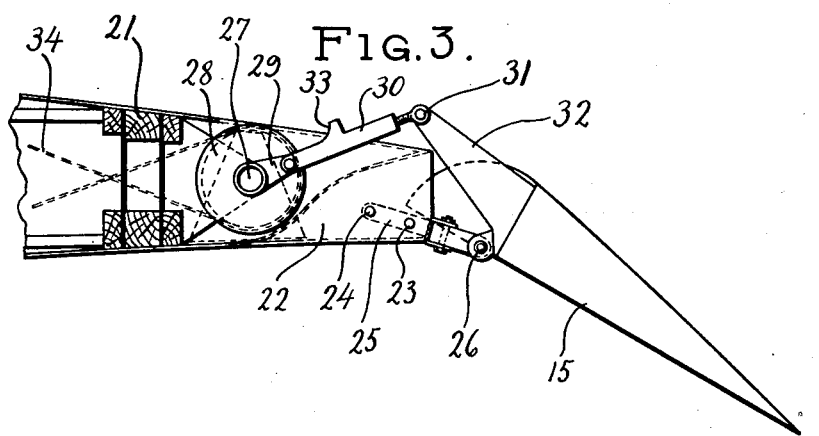
INVENTOR
ROBERT R. OSBORN
BY
ATTORNEY July 26, 1932.  R. R. OSBORN  1,869,211
AEROFOIL OPERATING MECHANISM
Filed March 19, 1930   2 Sheets-Sheet 2
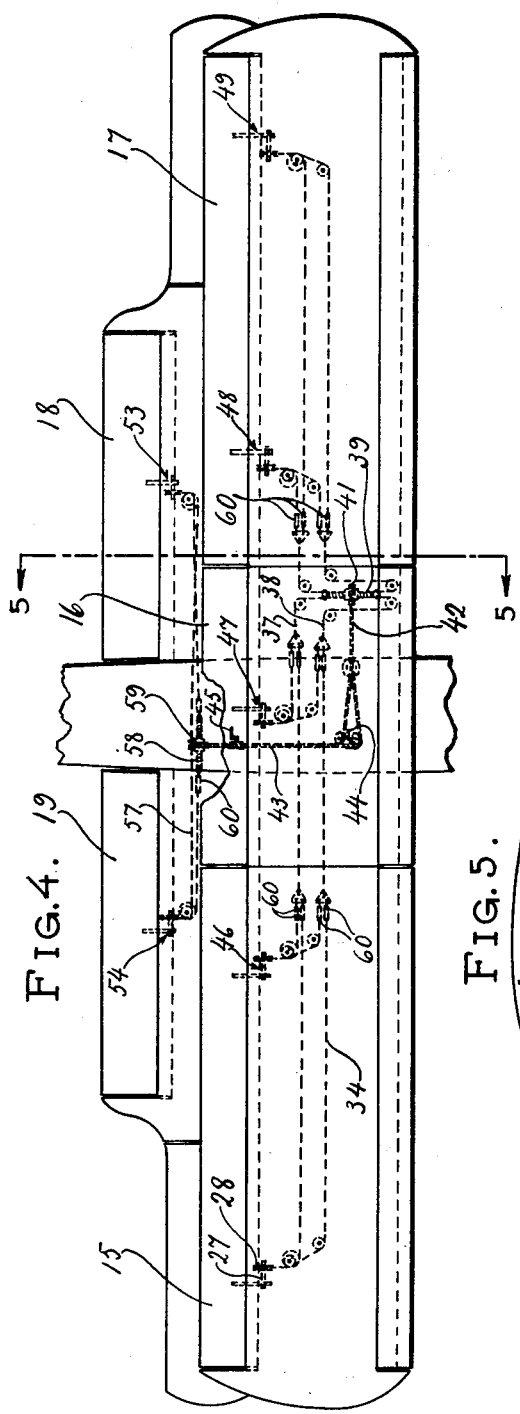
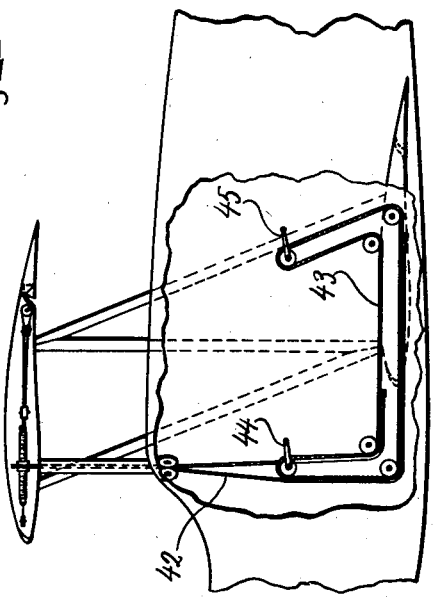
INVENTOR
ROBERT R. OSBORN
BY
ATTORNEY Patented July 26, 1932

1,869,211

UNITED STATES PATENT OFFICE

ROBERT R. OSBORN, OF GARDEN CITY, NEW YORK, ASSIGNOR TO CURTISS AEROPLANE & MOTOR COMPANY, INC., A CORPORATION OF NEW YORK

AEROFOIL OPERATING MECHANISM

Application filed March 19, 1930. Serial No. 436,951.

This invention relates to airplanes and more specifically to operating mechanism for trailing edge flaps such as are sometimes used thereon.

Prior to my invention trailing edge flaps have sometimes been provided and when used have usually been fastened to or adjacent to the rear edge of the wings of the airplane, but so far as I am aware in all prior devices of this nature, during at least one of the extreme or normal operating positions of the flap, the loads imposed upon trailing edge flaps by the force of the air stream are transmitted to the means which are employed for moving the flap from one of said normal positions to the other.

One of the objects of my invention is to provide a trailing edge flap for wings of airplanes and operating means therefor so designed that at both of its extreme positions of adjustment no part of the loads imposed upon the flap by the air stream are transmitted to said operating means.

Further objects will be apparent from a reading of the subjoined specification and claims and from a consideration of the attached drawings.

In order to explain the invention more clearly, one embodiment thereof is shown in said drawings, in which:

Fig. 1 is a top plan view of an airplane equipped with devices constructed according to my invention;

Fig. 2 is a view in detail and in vertical section of one of the wings of the airplane shown in Fig. 1, with parts broken away and on an enlarged scale showing the trailing edge flap in its upper operating position;

Fig. 3 is a view similar to Fig. 2 but showing the trailing edge flap in its downward operating position;

Fig. 4 is a diagrammatic plan view showing the operating connections for the trailing edge flaps; and Fig. 5 is a diagrammatic sectional view taken on the line 5—5 of Fig. 4 for further illustrating the operating mechanism of the flaps.

Referring particularly to the drawings, I have shown an airplane 11 having an upper wing 12 and lower wings 13 and 14. The upper wing 12 has a trailing edge flap consisting of sections 15, 16 and 17 and the lower wings 13 and 14 have trailing edge flaps 18 and 19.

Each of these sections of trailing edge flaps is supported near or adjacent to the rear of its associated wing. The wing 12 is shown as provided with a rear spar 21. Fixedly secured to this rear spar are a plurality of brackets such as the bracket 22. All of these brackets 22 combine to support the wing flap 15, and inasmuch as all of the supports are similar, description of one will be sufficient. Securely fastened to the bracket 22 as by the rivets 23 and 24, is the arm 25. The flap 15 is pivotally secured on bearings 26 on the riveted arms 25. The pivotal supports 26 allow free movement of the flap 15 about the pivots but means are provided to control this pivotal movement. A shaft 27 is mounted in the brackets 22 and has secured thereto a wheel or pulley 28. Several levers such as the lever 29 are secured to the shaft 27 and pivotally secured to each of the levers is a link 30 which is adjustably and pivotally secured as at 31 to a forwardly extending arm 32 of the flap 15. The link 30 has intermediate its ends an upwardly extending nose 33 which is adapted when the flap is in its upper position as shown in Fig. 2 to bear against the shaft 27. When the flap 15 is in the position shown in Fig. 2, the air forces acting upward on the flap are transmitted through the bearing 26 and the shaft 27 to the bracket 22. Because of the pressure of the nose 33, no turning moment is transmitted to the wheel 28. Moreover, when the flap 15 is in the position shown in Fig. 3 the air forces acting upward upon the flap are transmitted through the lever 29 and the link 30 to the shaft 27 but inasmuch as the lever 29 and the link 30 when the flap is in this position, are both aligned or nearly aligned with the center of the shaft 27, there is little or no turning moment transmitted to the wheel 28. Thus, the force acts only upon the shaft 27 and through it upon the bracket 22 and the spar 21. A cable such as that shown at 34 is provided and extends to a point within the cockpit for rotating the wheel 28 and thus for moving the flap from the position shown in Fig. 2 which is the normal high speed position to the position shown in Fig. 3 which is the normal low speed position.

The opposite ends of the cable 34 are connected to other cables 37 and 38 which lead to opposite ends of a worm screw 39. The worm screw 39 is operated by a worm wheel 41 driven by a sprocket chain 42. The worm wheel 41 is held from movement of translation by bearings, and screw 39 is held from turning by any suitable means. Thus when worm wheel 41 is rotated, screw 39 translates thru it. The sprocket chain 42 is connected to a second sprocket chain 43 in turn driven by either one of the hand cranks 44 or 45. Additional units 46, 47, 48 and 49 each composed of levers such as 29, shafts such as 27, and pulleys such as 28, are provided for operating other parts of the flaps 15, 16 and 17. Similar units 53 and 54 are provided for the lower wing flaps 18 and 19. These latter units are connected through cables such as 57 to a worm 58 operated by a worm wheel 59 and driven by the sprocket chain 43. Suitable pulleys should be provided at convenient points, and turnbuckles 60 should be provided for adjusting any section of the cables.

It it thought that the operation of the device described in illustration of my invention will be clear from the above description. When the pilot desires to fly at maximum speed he moves the cable 34 as by means of one of the hand cranks, one or more of the sprocket chains and one or more of the worm screws and thus turns the wheel 28 in a clockwise direction until the nose 33 contacts with the shaft 27 and the trailing edge flap 15 assumes the position of Fig. 2. As previously stated, the air forces acting upon the flap 15 now exert no strain upon the cable 34, the loads being carried by the bearing 26, the shaft 27, the bracket 22 and the spar 21. When the pilot desires to fly at a minimum speed he again operates the cable 34 as by means of a hand crank, but in a reverse direction, to turn the wheel 28, in a counter-clockwise direction, thus moving the flap to the position shown in Fig. 3. This increases the camber of the wing by increasing the rise of the curve of the airfoil section from the chord and thus increases the lift of the wing. In this position strains upon the cable 34 are similarly eliminated inasmuch as the lever 29 and the link 30 are both aligned or nearly aligned with the center of the shaft 27 and thus transmit the air loads directly to said shaft and through it to the bracket 22 and the spar 21.

The worms 39 and 58 and the associated elements make the operating means for the flaps irreversible. The cranks 44 and 45 may be operated at any time to move the flaps to and from either of their extreme positions or to and from any intermediate positions but loads on the flaps are never transmitted to said hand cranks.

It is to be especially noted that when the flap 15 is in the position shown in Fig. 2, which is the high speed position, the elements 30, 31 and 32 are all positioned within the outlines of the basic airfoil and therefore do not offer as great wind resistance as is offered by similar elements which are, (as in the ordinary type of flap operating mechanism) exposed to the air stream in the position of adjustment for high speed operation. It is true, that in the position shown in Fig. 3 the parts 30, 31 and 32 do protrude beyond the outlines of the basic airfoil, but the protrusion at this time is relatively unimportant, inasmuch as it is at the high speed position of adjustment that it is desired to fly most swiftly and therefore it is at this position that it is most important that drag be reduced to a minimum.

In the illustration of my invention I have shown the flaps operated by means of a cable control. It is clear that without departing from the spirit or scope of the invention a torque rod or push and pull rods could be substituted therefor.

The mechanical advantage of the movement of the cable 34 over the movement of the flap 15 varies depending upon the position of the flap 15. When said flap is in the position shown in Fig. 3 the air loads upon it are much stronger than when the flap is in the position shown in Fig. 2 or any intermediate positions. From a consideration of the drawings, it is clear that equal movement of the flap from the position shown in Fig. 2 requires a larger movement of the wheel 28 and the cable 34 than is required for an equal movement of the flap from the position shown in Fig. 3. Therefore the proportion of the loads on the flap 15 which are transmitted to the cable 34 is least when the loads on the flap are greatest.

It is to be understood that the above described embodiment of the invention is for the purpose of illustration only and various changes may be made therein without departing from the spirit and scope of the invention.

I claim as my invention:

1. In an airplane, a main wing, a trailing edge flap attached to said main wing, means for moving said trailing edge flap from a position in which it is a substantial continuation of the main wing to a position in which it is inclined downward therefrom said means comprising a link pivotally attached to said trailing edge flap, a shoulder formed thereon, a pivoted element to which said link is also pivotally attached, a cable for moving said last named element, and an element incapable of relative bodily displacement with which said shoulder at times contacts, whereby the loads imposed by the air forces upon said trailing edge flap are prevented from acting upon said cable.

2. In an airplane, a main wing, a flap attached to said main wing, a link pivotally attached to said flap, a pivoted element to which said link is also pivotally attached, means for moving said last named element, and means independent of said moving means for taking the loads imposed by the air forces upon said flap in both the raised and lowered positions of said flap.

3. In an airplane, a wing, a flap for said wing, means for moving said flap from a position in which it is a substantial continuation of the wing to a position in which it is inclined downward therefrom, said means comprising a link pivotally attached to said flap, a pivoted element to which said link is also pivotally attached, means for moving said last named pivoted element so that in one operative position of said flap said pivoted link and said pivoted element are in longitudinal alignment whereby air forces acting upon said airfoil exert no turning moment upon said pivoted element, and means operative in a second operative position of said airfoil for supporting said flap and for relieving said operating element of all strains due to forces imposed upon the trailing edge flap by air pressures.

4. In an airplane, a main wing, a flap attached to said main wing, means for moving said flap including a rotatable element having a projection formed thereon, a pivoted element connected to said rotatable element and adapted to be moved thereby and having a shoulder formed thereon adapted at times to contact with said projection for supporting said flap against air pressures in one operative position of said flap.

5. In an airplane, a main wing, a flap attached to said main wing, a link pivotally attached to said flap, a shoulder formed on said link, a pivoted member to which said link is also pivotally attached, means for moving said pivoted member, and an element incapable of relative bodily displacement with which said shoulder at times contacts.

6. In an airplane, a main wing, a flap attached to said main wing, a member incapable of relative bodily displacement, and means for mounting said flap upon said main wing including a pivoted element having a shoulder formed thereon adapted to contact with said member.

7. In an airplane, a main wing, a flap attached to said main wing, a pivoted element connected to said flap for moving said flap, a pulley connected with said pivoted element for operating said pivoted element, a flexible connection passing around said pulley, a worm screw connected to said flexible connection, a sprocket wheel fixed against translation and mounted to rotate upon said worm screw, a sprocket chain passing around said sprocket wheel and extending to a point adjacent to the seat of the pilot of the airplane, and means also positioned adjacent to said seat for moving said sprocket chain.

In testimony whereof I hereunto affix my signature.

ROBERT R. OSBORN.